Patented Dec. 19, 1939

2,183,556

UNITED STATES PATENT OFFICE 2,183,556

HALOGENATED SOLID ETHYLENE POLYMER

Eric William Fawcett, Northwich, England, assignor to Imperial Chemical Industries Limited, a corporation of Great Britain No Drawing. Application September 10, 1937, Serial No. 163,326. In Great Britain September 11, 1936

17 Claims. (Cl. 260—94)

This invention relates to polymeric materials and more particularly to new and useful products obtained by halogenating ethylene polymers.

In application Serial Number 123,722, filed February 2, 1937, by myself, R. O. Gibson and M. W. Perrin, and in application Serial Number 157,810, filed August 6, 1937 by M. W. Perrin, J. G. Paton and E. G. Williams, methods are described for the production of solid polymers of high molecular weight from ethylene, in which the initial material is subjected under specified conditions to high pressure.

I have found that polymeric products of distinctively different properties, which adapt them to uses to which the ethylene polymers are not suited, are obtained by halogenating the ethylene polymers referred to above.

This invention has as an object the manufacture of new and useful compositions of matter. Further objects reside in new polymeric products derived from ethylene and in processes for obtaining these polymeric products. Other objects will appear hereinafter.

These objects are accomplished by halogenating ethylene polymers as will be described more fully below.

The ethylene polymers which are further treated in accordance with the practice of this invention are those made by the process described in either of the above mentioned applications. The process described in the first mentioned application consists in subjecting ethylene to pressures in excess of 500 atmospheres under controlled elevated temperature conditions. This procedure results in various polymers of ethylene, the molecular weight of which varies depending particularly upon the pressure employed. By using pressures of more than 1000 atmospheres solid polymers of ethylene can be formed. Under these conditions the polymerization reaction takes place smoothly, requiring several hours for completion. Or the more rapid reaction described in the second mentioned application may be used. In this method a definite but small quantity of oxygen which may be as little as 0.01% but preferably 0.03% to 0.10% at 1500 atmospheres, is included in the ethylene treated. The pressures are at least 500 atmospheres and preferably at least 1000 atmospheres and below 30000 atmospheres. The temperatures are between 100° C. and 400° C. and more desirably from 150° C. to 250° C. Thus, as a specific instance of obtaining the ethylene polymer, ethylene containing 0.05% oxygen is compressed in a steel bomb to a total pressure of 1500 atmospheres and heated rapidly to 210° C. whereupon a very sudden rise in pressure followed by a slow drop in pressure is observed. After five hours' heating at 210° C. the pressure is released and the product cooled. Under these conditions an 80% yield of the solid polymer, based on the ethylene used, is obtained. The ethylene polymers obtained as outlined above melt within the range of 100° to 120° C., have a molecular weight in excess of 2000, and are essentially saturated products corresponding in composition substantially to $(CH_2)_x$.

In carrying out my invention the halogenation of the ethylene polymer may be effected by means of a halogenating material which may be the free halogens, or suitable halogenating compounds optionally in the presence of halogen carriers such as iodine, aluminium chloride, or ferric chloride. Preferably the reaction is carried out on a solution or a suspension of the polymer in a medium which will not react with halogen or halogenating agents under halogenating conditions for ethylene polymers, for example acetic acid or carbon tetrachloride, chloroform, trichloroethylene, tetrachloroethane, etc. The polymers used in the process of this invention are soluble in xylene at its boiling point and are unaffected by prolonged contact with air at ordinary temperatures.

The reaction may be carried out at room temperature or at an elevated temperature. In the former case, the ethylene polymer is preferably suspended in an inert medium, e. g., carbon tetrachloride or acetic acid; but unless the time of reaction is unduly prolonged only up to some 20% of chlorine can conveniently be introduced by this procedure. At an elevated temperature, the reaction is much more rapid, although the actual rate depends to some extent on the solvent used, if one is used. For instance, chlorination of ethylene polymer in solution in carbon tetrachloride is much more rapid than in suspension in acetic acid. At an elevated temperature up to 40–45% by weight of chlorine (or equivalent of other halogen) can readily be introduced into the polymer. In general the reaction goes smoothly at room or elevated temperature tending at first to be fairly rapid, then slowing down as halogenation proceeds.

A wide range of products is obtainable. The original ethylene polymers are usually tough and horn-like. As halogen is introduced, the polymer becomes at first less horn-like and more rubbery, its solubility increases and eventually its softening point rises. In the case of chlorine this effect progresses until about 30% of chlorine has been introduced. Beyond this point a fairly sharp change recurs, the resulting product becoming fibrous and very sparingly soluble and of high softening point. A typical product in this range is one containing 40-45% of chlorine. As the halogen content is still further increased, a gradual change to a hard, brittle, insoluble resin occurs. By selecting the halogen content and/or by fractionation of the halogenated polymer, a variety of products of graded properties is obtainable. Fractionation may be effected by fractional solvent extraction or fractional precipitation from hot solvents. The properties are, however, not entirely dependent upon the halogen content; to a certain degree they depend upon the conditions of preparation. The general tendency is for products prepared at elevated temperatures to be softer and more soluble than those prepared at room or lower temperatures with or without the aid of catalysts.

The following examples illustrate but do not limit the operation of the invention.

Example 1

One hundred parts by weight of solid ethylene polymer (average molecular weight 4550) are dissolved in the minimum amount of boiling carbon tetrachloride and the solution is cooled rapidly to room temperature. The fine suspension thus obtained is treated with 4.0 parts by weight of bromine in carbon tetrachloride solution, the bromine being added over a period of 1 hour in small quantities. The mixture is allowed to stand at room temperature for 2 hours. The reaction is then complete. The product is filtered off and dried. The brominated polymer is a white solid which softens at a temperature of about 110° C. and is less soluble in most solvents than the original polymer. It can be drawn into threads or formed into sheets.

Example 2

One hundred parts of polymerized ethylene are treated as in Example 1, with 12 parts by weight of bromine. After completion of the addition of the bromine, the solution is boiled under a reflux condenser until all the bromine has reacted (in about 2 hours). The product is isolated by cooling and filtering off the brominated polymer. The product is a solid, having a softening point of 115° C.

Example 3

One hundred parts of ethylene polymer are treated at room temperature with gaseous chlorine until 15 parts by weight have been absorbed. The product contains 14.5% of chlorine and is a somewhat plastic solid, softening at about 100° C.

Example 4

One hundred grams of polymerized ethylene (molecular weight about 5600) are dissolved in 500 ccs. of carbon tetrachloride at the boiling point. Chlorine is passed into the solution at about 70° C. and in 12 hours about 45 grams of chlorine are absorbed. On cooling, the bulk of the product separates from the solvent. It is removed by filtration, washed wth water until free from chlorine and hydrogen chloride and if necessary further purified by reprecipitation from hot carbon tetrachloride.

The product is a tough fibrous solid, sparingly soluble in all solvents other than carbon tetrachloride (and other chlorinated solvents). It softens at about 140° C. and contains 43% chlorine.

Example 5

The general conditions are as for Example 4, but chlorination is continued for 100 hours. The product contains 53.5% Cl and is a hard resin which swells in hot solvents and dissolves only on long heating.

Example 6

Chlorine is passed into a suspension of 100 grams of polymerized ethylene suspended in 500 ccs. of glacial acetic acid at 100° C. for 24 hours. The reaction is considerably slower in this solvent than in carbon tetrachloride and the product isolated in the usual manner contains 19% chlorine. It is a slightly plastic white solid softening at 120° C. and easily soluble in boiling carbon tetrachloride, benzene, etc.

Example 7

One hundred parts of polymerized ethylene suspended in acetic acid at 100° C. are treated with 70 parts of bromine and the reaction is allowed to proceed until all the halogen has been absorbed. The product contains 71% of bromine and is a hard brittle resin sparingly soluble in boiling benzene and carbon tetrachloride. This crude product is split into three fractions by fractional precipitation from a hot benzene solution by adding increasing quantities of alcohol. The properties of the three fractions in order of decreasing solubility are given below:

|   | Bromine | Softening temperature | General properties |
|---|---|---|---|
|   | Percent | Degrees |   |
| (1) | 55.3 | 110 | Rubbery solid. |
| (2) | 71.5 | 125 | Fibrous tough solid. |
| (3) | 86.0 | 136 | Hard brittle resin. |

The halogenated organic compounds obtained in accordance with the foregoing examples appear to be halogenated long chain hydrocarbons of high molecular weight. Progressive halogenation results in products which are less resinous, more fibrous and "rubbery", and which have an increased softening temperature and a decreased solubility in most solvents, as compared with the initial olefin polymer. The new halogenated compounds are suitable as film-formers, electrical insulators and dielectric materials.

As many apparently widely different embodiments of this invention may be made without departing from the spirit and scope thereof it is to be understood that I do not limit myself to the specific embodiments thereof except as defined in the appended claims.

I claim:

1. The halogenated product obtained by halogenating a polymer of ethylene which is a solid at normal temperatures, has a melting point within the range of 100° to 120° C., has a molecular weight in excess of 2000, and corresponds in composition substantially to $(CH_2)_x$.

2. The halogenated product obtained by halogenating a polymer of ethylene which is substantially identical with that obtained by subjecting ethylene to a pressure in excess of 500 atmospheres at a temperature of from 100° to 400° C.

3. The halogenated product obtained by halogenating the solid tough polymer of ethylene which is substantially identical with that obtained by subjecting ethylene to a pressure of from 1000 to 3000 atmospheres at a temperature of 150° C. to 250° C.

4. A process which comprises reacting with halogen the product obtained by subjecting ethylene to a pressure in excess of 500 atmospheres at a temperature of from 100° C. to 400° C.

5. The process set forth in claim 4 in which said pressure is from 500 to 3000 atmospheres.

6. The process set forth in claim 4 in which said pressure is from 1000 to 3000 atmospheres and in which said temperature is from 150° C. to 250° C.

7. A process which comprises reacting a solution of the solid polymer of ethylene in a halogen-stable solvent with a halogenating material, said solid ethylene polymer being that obtained by subjecting ethylene to a pressure in excess of 500 atmospheres at a temperature of from 100° C. to 400° C.

8. A process which comprises reacting solid polymer of ethylene in suspension in a halogen-stable medium with a halogenating material, said solid ethylene polymer being that obtained by subjecting ethylene to a pressure of 500 to 3000 atmospheres at a temperature of from 100° C. to 400° C.

9. The process set forth in claim 7 in which said solvent is carbon tetrachloride.

10. The process set forth in claim 7 in which said halogenating material is bromine.

11. The process set forth in claim 7 in which said halogenating material is chlorine.

12. The halogenated product set forth in claim 1 which contains from about 14% to 86% halogen.

13. The halogenated product set forth in claim 1 in which the halogen is chlorine.

14. The halogenated product set forth in claim 1 in which the halogen is bromine.

15. The halogenated product set forth in claim 1 which is a tough fibrous solid containing about 43% chlorine.

16. The halogenated product set forth in claim 1 which is a hard resin containing about 53.5% chlorine.

17. The halogenated product set forth in claim 1 which is a hard brittle resin containing about 71% bromine.

ERIC WILLIAM FAWCETT.

CERTIFICATE OF CORRECTION.

Patent No. 2,183,556. December 19, 1939.

ERIC WILLIAM FAWCETT.

It is hereby certified that error appears in the printed specification of the above numbered patent requiring correction as follows: Page 1, first column, line 49, for "30000 atmospheres" read 3000 atmospheres; and that the said Letters Patent should be read with this correction therein that the same may conform to the record of the case in the Patent Office.

Signed and sealed this 6th day of February, A. D. 1940.

(Seal)

Henry Van Arsdale,
Acting Commissioner of Patents.